(12) United States Patent
Lee et al.

(10) Patent No.: US 10,514,297 B2
(45) Date of Patent: Dec. 24, 2019

(54) ELECTRONIC CIRCUITRY FOR CONTROLLING IN ORDER TO PERFORM EXPOSURE MEASUREMENTS CONTINUOUSLY, SPECTROMETER USING THE SAME AND MEASUREMENT METHOD OF THE SPECTROMETER

(71) Applicant: OTO PHOTONICS INC., Hsinchu (TW)

(72) Inventors: Meng-Wei Lee, Hsinchu (TW); Hsu Feng Cheng, Hsinchu (TW); Jan Liang Yeh, Hsinchu (TW)

(73) Assignee: OTO PHOTONICS INC., Hsinchu, Taiwan (CN)

( * ) Notice: Subject to any disclaimer, the term of this patent is extended or adjusted under 35 U.S.C. 154(b) by 61 days.

(21) Appl. No.: 15/343,220

(22) Filed: Nov. 4, 2016

(65) Prior Publication Data
US 2017/0167920 A1 Jun. 15, 2017

(30) Foreign Application Priority Data
Dec. 9, 2015 (TW) .............................. 104141265 A (51) Int. Cl.
*G01J 3/02* (2006.01)
*G01J 3/28* (2006.01)

(52) U.S. Cl.
CPC ......... *G01J 3/027* (2013.01); *G01J 2003/283* (2013.01); *G06T 2207/10144* (2013.01); *G06T 2207/20* (2013.01)

(58) Field of Classification Search
CPC .................. G01J 2003/2836; G01J 2003/2833
See application file for complete search history.

(56) References Cited

U.S. PATENT DOCUMENTS

| 5,175,697 | A | * | 12/1992 | Kawagoe ................. G01J 3/28 356/320 |
| 5,296,816 | A | * | 3/1994 | Birkinshaw .......... H01J 49/025 324/109 |
| 5,305,233 | A | | 4/1994 | Kawagoe et al. |
| 5,484,994 | A | * | 1/1996 | Roustaei ................. G03F 7/705 235/462.25 |

(Continued)

FOREIGN PATENT DOCUMENTS

| CN | 1430723 A | 7/2003 |
| CN | 103091289 | 5/2013 |

(Continued)

*Primary Examiner* — Michael P LaPage
(74) *Attorney, Agent, or Firm* — Cheng-Ju Chiang (57) ABSTRACT

An electronic circuitry of a spectrometer, configured to electrically connect with an optical sensor of the spectrometer, includes a memory unit configured to store a measurement setting, a trigger line configured to transmit at least one trigger signal, and a control unit electrically connected to the trigger line and the memory unit. The control unit is configured to receive the trigger signal from the trigger line so as to instruct the spectrometer to perform a plurality of exposure measurements continuously under the measurement setting, and to save a plurality of spectral data acquired from the exposure measurements into the memory unit. A spectrometer using the electronic circuitry for performing the exposure measurements and a measuring method of the spectrometer are also provided.

26 Claims, 4 Drawing Sheets

(56) References Cited

U.S. PATENT DOCUMENTS

| | | | |
|---|---|---|---|
| 6,349,174 B1* | 2/2002 | Ray | G01S 17/89 |
| | | | 348/E13.018 |
| 8,351,675 B2 | 1/2013 | So et al. | |
| 2003/0133018 A1* | 7/2003 | Ziemkowski | H04N 5/2256 |
| | | | 348/211.2 |
| 2009/0080709 A1* | 3/2009 | Rowe | G06K 9/00013 |
| | | | 382/115 |
| 2013/0094716 A1* | 4/2013 | Carpio | G06T 5/50 |
| | | | 382/109 |
| 2014/0043320 A1* | 2/2014 | Tosaya | G02B 27/0172 |
| | | | 345/419 |
| 2016/0025569 A1* | 1/2016 | Hargreaves | G01J 3/0291 |
| | | | 356/301 |
| 2016/0076997 A1* | 3/2016 | Koerner | A61B 10/0266 |
| | | | 250/339.07 |
| 2016/0356647 A1* | 12/2016 | Wiegand | G01J 3/027 |
| 2017/0261375 A1* | 9/2017 | Suzuki | G01J 3/36 |

FOREIGN PATENT DOCUMENTS

| | | |
|---|---|---|
| CN | 103728446 | 4/2014 |
| CN | 102466520 B | 12/2014 |
| TW | 200916743 A | 4/2009 |

* cited by examiner

ELECTRONIC CIRCUITRY FOR CONTROLLING IN ORDER TO PERFORM EXPOSURE MEASUREMENTS CONTINUOUSLY, SPECTROMETER USING THE SAME AND MEASUREMENT METHOD OF THE SPECTROMETER

FIELD OF THE INVENTION

The present invention relates to an electronic circuitry of an optical measurement apparatus, and more particularly to an electronic circuitry of a spectrometer, the spectrometer using the electronic circuitry, and the measurement method of the spectrometer.

BACKGROUND OF THE INVENTION

In a spectral measurement according the prior art, a computer connected to a spectrometer would send an instruction to the spectrometer. The spectrometer would then perform an exposure according to the instruction to acquire a spectrum of a light and transmit the acquired spectrum back to the computer. During the transmission, the spectrometer would be paused, and no exposure could be performed. The computer could send out the next instruction to the spectrometer only after the transmission is completed. Consequently, the spectrometer would have to wait between exposures for data transmission to complete.

Such spectral measurement has been disadvantageous in measuring unstable and short-lived substances, such as reaction intermediates, which require multiple exposure measurements to be performed within a very limited time frame to obtain sufficient amounts of spectral data for analysis of such intermediates.

The wait required in existing spectral measurements are generally long and unstable, and could vary by the speed of data transmission between the spectrometer and the computer. Therefore, the conventional spectrometer may be easy to fail to obtain sufficient amounts of valid spectral data within a limited time frame.

BRIEF SUMMARY OF THE INVENTION

The present invention provides an electronic circuitry of a spectrometer that enables the spectrometer to continuously perform multiple exposure measurements.

The present invention also provides a spectrometer using the aforementioned electronic circuitry.

The present invention further provides a measurement method of the aforementioned spectrometer.

According to an embodiment of the present invention, an electronic circuitry of a spectrometer is configured to electrically connect with an optical sensor of the spectrometer. The electronic circuitry includes a memory unit, a trigger line, and a control unit. The memory unit is configured to store a measurement setting. The trigger line is configured to transmit at least one trigger signal. The control unit is electrically connected to the trigger line and the memory unit, and is configured to receive the trigger signal from the trigger line so as to instruct the spectrometer to perform a plurality of exposure measurements continuously under the measurement setting, and to save a plurality of spectral data acquired from the exposure measurements into the memory unit.

According to another embodiment of the present invention, a spectrometer using an electronic circuitry is configured for performing a plurality of exposure measurements. The spectrometer includes a dispersive element, an optical sensor, and the aforementioned electronic circuitry. The control unit of the electronic circuitry is electrically connected to the optical sensor. During the exposure measurements, the dispersive element generates a plurality of spectral rays, and the optical sensor receives the spectral rays to generate a plurality of spectral data.

According to yet another embodiment of the present invention, a measurement method of a spectrometer includes: receiving at least one trigger signal from a trigger line; instructing the spectrometer to perform a plurality of exposure measurements continuously under a measurement setting stored in a memory unit according to the at least one trigger signal; and saving a plurality of spectral data acquired from the exposure measurements into the memory unit.

In sum, the electronic circuitry according to the embodiments of the present invention utilizes the memory unit to save the plurality of spectral data directly from the spectrometer, therefore allowing the spectrometer to perform multiple exposure measurements continuously without having to pause between measurements for transmission of spectral data to a processing device. Therefore, the spectrometer according to the embodiments of the present invention can continuously expose and measure within a limited time frame, and is thus advantageous in acquiring sufficient amounts of valid spectral data for analysis of reaction intermediates or other special substances or objects.

For making the above and other features and benefits become more readily apparent to those ordinarily skilled in the art, the embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of embodiments of this invention are presented herein for purpose of illustration and description only. It is not intended to be exhaustive or to be limited to the precise form disclosed.

Figure 1A:
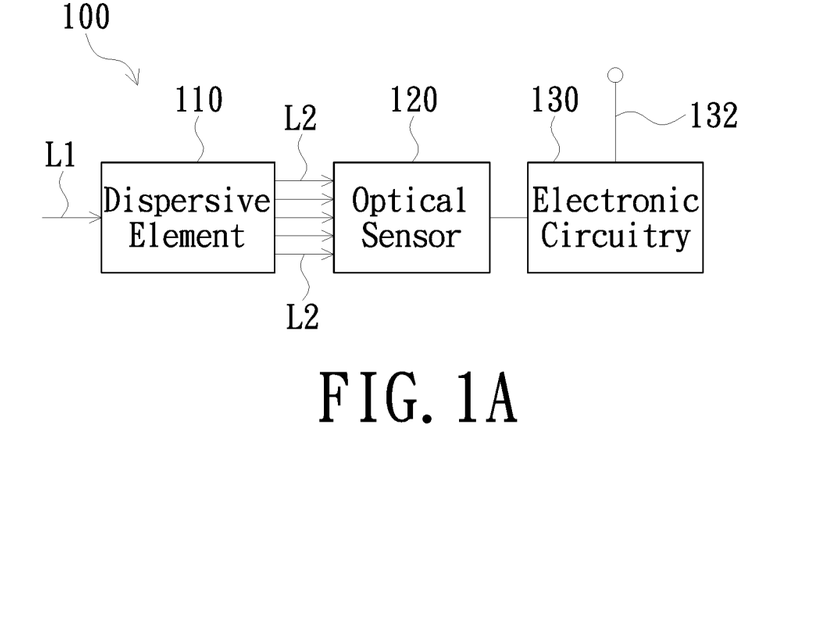
FIG. 1A is a block diagram illustrating the configuration of a spectrometer according to an embodiment of the present invention.

Referring now to FIG. 1A. Spectrometer 100 according to an embodiment of the present invention includes a dispersive element 110, an optical sensor 120 and an electronic circuitry 130. The dispersive element 110 may separate an incident light L1 by diffraction, refraction or filtering into a plurality of spectral rays L2 of different wavelengths. The dispersive element 110 may be a transmissive grating, a reflective grating, a prism, or a filter array. The filter array may be a plurality of filters that are linearly aligned or arranged into a two-dimensional array.

The optical sensor 120 is configured to receive the spectral rays L2 and convert the spectral rays L2 into electrical signals carrying the spectral data of the spectral rays. The optical sensor 120 may be an one-dimensional or two-dimensional optical sensor array, such as an photodiode array, a charge-coupled device (CCD) or a complementary metal-oxide semiconductor (CMOS).

The electronic circuitry 130 may be a circuit board assembly, such as a printed circuit board assembly (PCBA). The electronic circuitry 130 may also be a semiconductor package, such as a wafer-level chip-scale package (WLCSP), a chip-scale package (CSP) or a system in package (SiP).

In the case where the electronic circuitry 130 is a semiconductor package, the electronic circuitry 130 may be an integrated circuit (IC), such as a packaged chip. Consequently, the electronic circuitry 130 may be a discrete component which can be mounted on a circuit board disposed with the optical sensor 120, thus connecting the electronic circuitry 130 to the optical sensor 120 via the circuit board.

Furthermore, the electronic circuitry 130 may also connect to the optical sensor 120 via a connector. For example, in the case where the electronic circuitry 130 is a circuit board assembly, the electronic circuitry 130 and the optical sensor each has one of a pair of detachably joined connectors with one having a plug and the other having a socket for the plug. The pair of connectors may include a bus or a hardware port, such as a serial port or a parallel port. The serial port may be a universal serial bus (USB), an RS-232-C serial port, or an RS-485 serial port.

According to the foregoing, a circuit board or connectors may be utilized to electrically connect the electronic circuitry 130 to the optical sensor 120. When the electronic circuitry 130 is electrically connected to the optical sensor 120, the electronic circuitry 130 may transmit instructions to the optical sensor 120 via the circuit board or connectors for instructing the optical sensor 120 to perform exposure measurements. Meanwhile, the optical sensor 120 may convert the spectral rays L2 into electrical signals and transmit the electrical signals to the electronic circuitry 130.

Figure 1B:
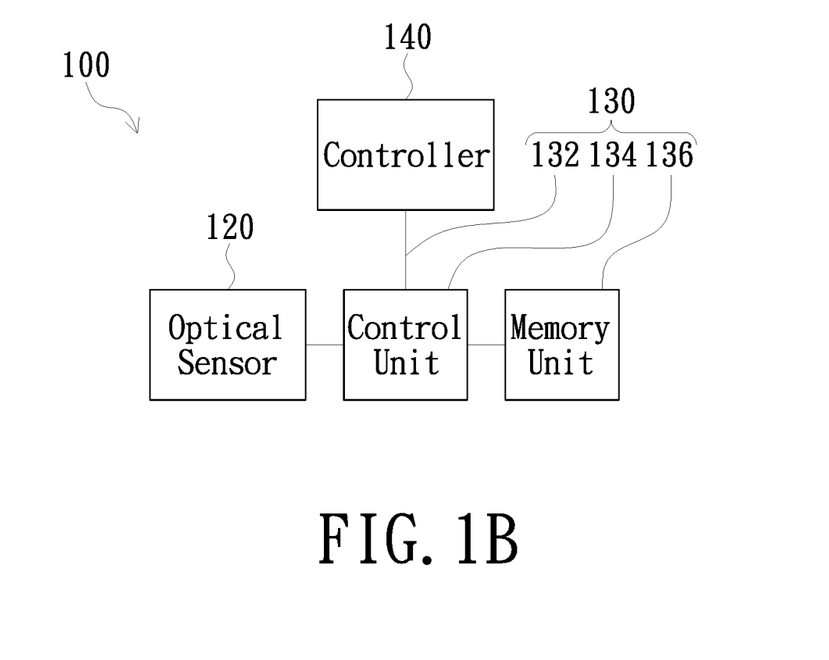
FIG. 1B is a block diagram illustrating the electronic circuitry of FIG. 1A.

Also referring to FIG. 1B. The electronic circuitry 130 includes a trigger line 132. The trigger line 132 may be an electrical wire or a hardware transmission cable electrically and detachably connected to a control unit 134 of the electronic circuitry 130. The trigger line 132 may also be a metal wire welded on a circuit board or a trace of the circuit board. The trigger line 132 may be electrically connected to a controller 140 that is configured to generate a plurality of trigger signals. The trigger line 132 may transmit the trigger signals generated by the controller 140.

The controller 140 may be a computer, a mobile device, a programmable logic controller (PLC), a microcontroller (MCU), a microprocessor (µP) or a programmable logic device (PLD). The mobile device may be a smart phone or a tablet. The trigger line 132 may be electrically and detachably connected to the controller 140 and the control unit 134.

Referring now to FIG. 1B. The electronic circuitry 130 may further include the control unit 134 and a memory unit 136. The control unit 134 is electrically connected to the optical sensor 120, the trigger line 132 and the memory unit 136, and may be a processor, such as a MCU, µR or PLD.

The memory unit 136 is configured to store a measurement setting, which determines at least one measurement parameter of the optical sensor 120. The measurement parameter may include the total number of exposures and/or the time points of exposures. The control unit 134 may receive the trigger signals from the trigger line 132 and, upon reception of the trigger signals, instruct the spectrometer 100 to perform exposure measurements by exposing according to the measurement setting. In other words, the trigger signals may be regarded as instructions for triggering the spectrometer 100 to execute exposure measurements.

In the present embodiment, the measurement setting may be a measurement schedule with parameters and sequence for the exposure measurements listed therein. For example, as shown in Table 1, the measurement schedule may include the total number of exposures to be performed by the spectrometer 100, the duration of each of the exposures, and time intervals between two adjacent measurements.

TABLE 1

| | |
|---|---|
| Total Number of Exposures | 3 |
| Duration of First Exposure | 1 sec |
| Duration of First Interval | 0.1 sec |
| Duration of Second Exposure | 0.5 sec |
| Duration of Second Interval | 0.05 sec |
| Duration of Third Exposure | 0.8 sec |

It is to be understood that Table 1 merely exemplifies the schedule and durations for three exposure measurements and that the present invention is not limited thereto. The spectrometer 100 may perform two or more than three exposure measurements according to actual needs. Furthermore, the duration of first interval as listed in Table 1 refers to the time interval between the first and second exposure measurements. Similarly, the duration of second interval as listed in Table 1 refers to the time interval between the second and third exposure measurements.

According to the measurement schedule shown in Table 1, after the control unit 134 receives the trigger signals, the spectrometer 100 would perform the first exposure measurement for 1 second. After completion of the first exposure measurement followed by the first interval of 0.1 second, the spectrometer 100 would perform the second exposure measurement for 0.5 second. Likewise, after completion of the second exposure measurement followed by the second interval of 0.05 second, the spectrometer 100 would perform the third exposure measurement for 0.8 second. Consequently, the spectrometer 100 would perform three continuous exposure measurements according to the measurement schedule (that is, the measurement setting). It is to be understood that the spectrometer 100 may also perform two or more than three exposure measurements according to a different measurement schedule.

More specifically, the controller 140 may transmit two trigger signals via the trigger line 132 to the control unit 134 during the first and second intervals, respectively. After the control unit 134 receives the two trigger signals during the first and second intervals, the control unit 134 would instruct the optical sensor 120 to execute two exposures so as to perform the first and second exposure measurement as shown in Table 1. In other words, the trigger line 132 may transmit a plurality of trigger signals to the control unit 134 so that the spectrometer 100 performs a plurality of exposure measurements continuously. Such features will be described in more details in the following embodiment as shown in FIG. 2B.

In the present embodiment, the trigger signals may be digital signals and include signal edges, such as falling edges or rising edges. The control unit 134 may be falling edge-triggered or rising edge-triggered, and may instruct the optical sensor 12 to expose according to the detected signal edges. However, it is to be understood that the present invention is not limited thereto. The trigger signals may be analog signals in other embodiments.

The control unit 134 may receive the electrical signals carrying the spectral data from the optical sensor 120 and save the spectral data directly into the memory unit 136. Capacity of the memory unit 136 may be larger than 4 megabytes (MB); for example, 32 MB or 64 MB. The memory unit 136 may include volatile memory or non-volatile memory; that is, the memory unit 136 may be volatile or non-volatile. Alternatively, the memory unit 136 may include both volatile memory and non-volatile memory. In general, volatile memory is favorable in its fast read and write speed, and non-volatile memory is advantageous in its ability to save data with or without electricity.

The non-volatile memory may be flash memory, such as a memory stick (MS), a secure digital card (SD card) or a USB flash drive. In the case where the memory unit 136 is a memory card or a USB drive, the memory unit 136 may be detachably separated from the control unit 134 and thus not electrically connected to the control unit 134. Furthermore, the memory unit 136 may also be a register.

Figure 2A:
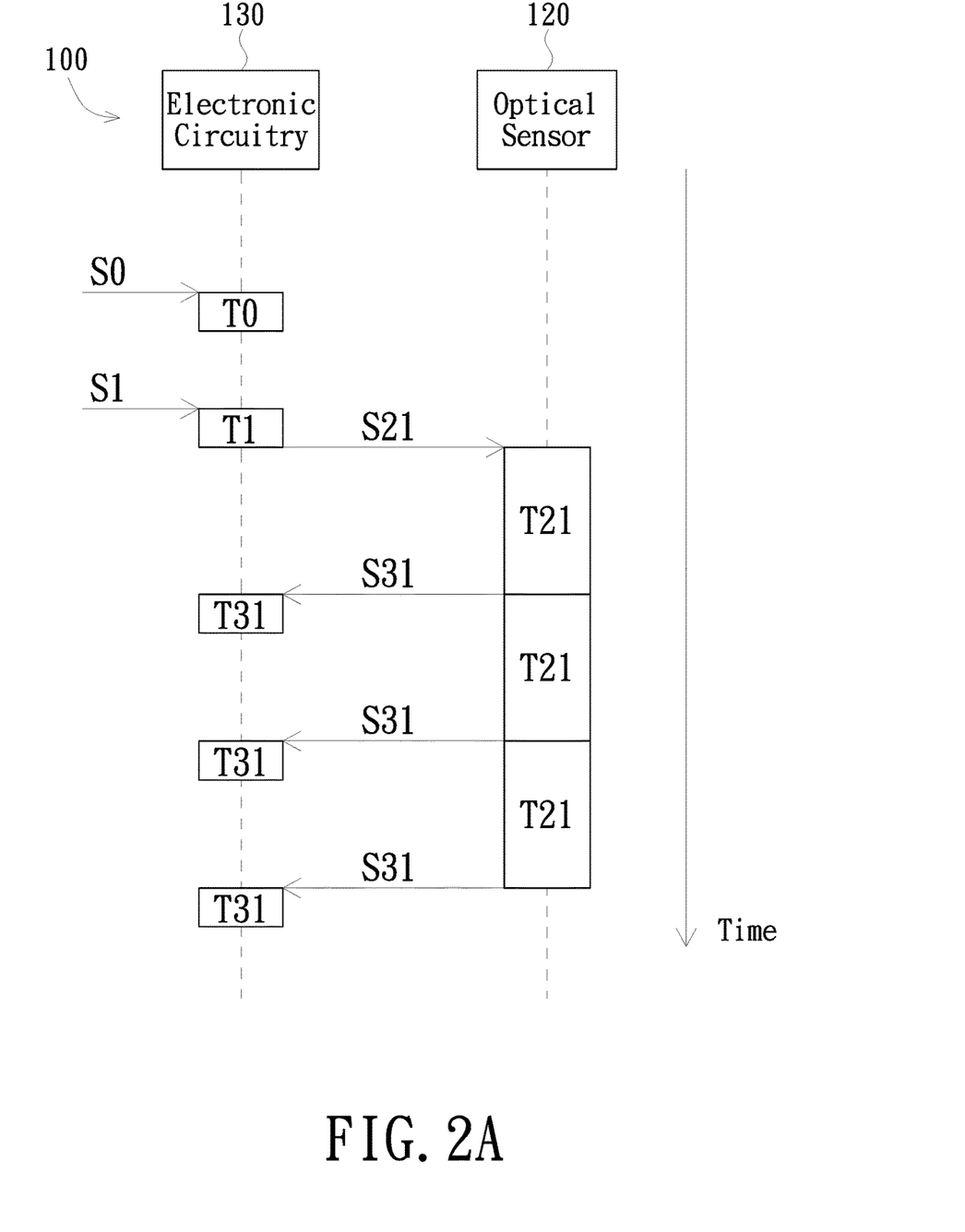
FIG. 2A is a sequence diagram illustrating the sequence for the spectrometer to perform a plurality of exposure measurements continuously according to an embodiment of the present invention.
Figure 2B:
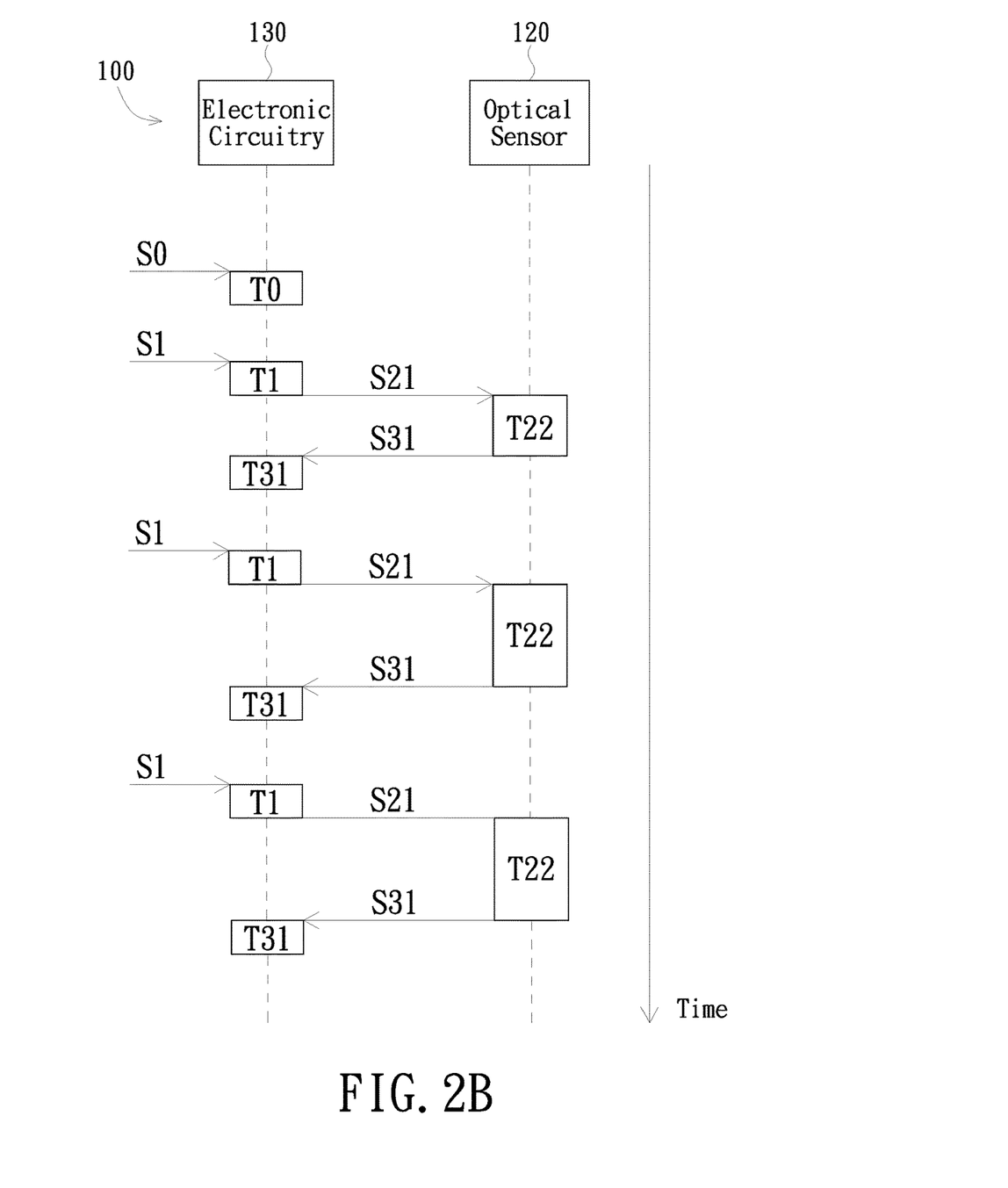
FIG. 2B is a sequence diagram illustrating the sequence for the spectrometer to perform a plurality of exposure measurements continuously according to another embodiment of the present invention.

Referring now to FIGS. 1B and 2A. Step S0 involves the controller 140 generating a setting signal and the trigger line 132 transmitting the setting signal to the control unit 134. The setting signal may be a machine language or a hardware description language (HDL). The control unit 134 receives the setting signal, enters a trigger mode, and generates the measurement setting. After a period of time T0 following the initiation of transmission of the measurement setting, the entire measurement setting would be saved in the memory unit 136, and the control unit 134 would completely enter the trigger mode.

In addition to entering the trigger mode by utilizing the setting signal, other methods are also feasible for the control 134 to enter the trigger mode. For example, after the spectrometer 100 starts, the control unit 134 may enter the trigger mode by automatically executing the firmware or software that is stored in the memory unit 136 and includes the measurement setting. More specifically, the memory unit 136 may include volatile memory and non-volatile memory, and the firmware or software may be stored in the non-volatile memory. The non-volatile memory may be flash memory or read-only memory (ROM), and the volatile memory may be random access memory (RAM).

When the spectrometer 100 starts, the control unit 134 would load the firmware or software in the non-volatile memory to the volatile memory, so that the control unit 134 may automatically execute the firmware and software stored in the memory unit 136, thereby entering the trigger mode. Therefore, in other embodiments, the control unit 134 may enter the trigger mode and determine the settings for upcoming exposure measurements without having to perform Step S0.

The trigger line 132 may also transmit a reset signal to the control unit 134 so that the control unit 134 may initialize the memory unit 136 according to the reset signal and change the measurement setting stored in the memory unit 136; for example, changing at least one of the total number of exposures and the duration of exposure T21 to a default value. The reset signal may also be a machine language or an HDL, and may be generated by the controller 140. In other words, the trigger signals, the setting signal, and the reset signal may be generated by a single source.

The step following Step S0 is Step S1. In Step S1, the trigger line 132 transmits a trigger signal to the control unit 134 under the trigger mode. After a latency T1 following reception of the trigger signal, the control unit 134 performs Step S21 for a plurality of times to instruct the optical sensor 120 to perform a plurality of exposures, therefore enabling the spectrometer 100 to perform a plurality of exposure measurements continuously under the measurement setting.

During the latency T1, the control unit 134 would determine a plurality of measurement parameters for the optical sensor 120, such as the duration of exposure T21 and the total number of exposures, so as to prepare for Step S21. In the present embodiment, preparations for entering Step S21 during the latency T1 are entirely performed by the control unit 134, rather than an external computer or mobile device. Additionally, the latency T1 is stable and does not exhibit significant variations.

The latency T1 is very short, for example, ranging from 20 microseconds (μs) to 100 μs, and is associated with performance of the control unit 134; that is, the higher the performance of the control unit 134, the shorter the latency T1. Therefore, the length of the latency T1 vary by the performance of the control unit 134, and is not limited to merely 20 μs-100 μs.

In the present embodiment, when the control unit 134 is not in the trigger mode, the control unit 134 would not instruct the optical sensor 120 to perform exposures even if a trigger signal has been received. However, in other embodiments without the trigger mode, the control unit 134 may still receive the trigger signal to instruct the optical sensor 120 to perform exposures.

In Step S21, the optical sensor 120 would expose for a duration of time T21 and receive the spectral rays L2 generated by the dispersive element 110, as illustrated in FIG. 1A, to generate a piece of spectral data and complete an exposure measurement. The measurement setting stored in the memory unit 136 may define all of the durations of exposures T21 as valid exposure durations, during which all spectral data acquired by the optical sensor 120 would be considered valid and be saved directly into the memory unit 136.

During Step S21, the optical sensor 120 would pause the exposure every of the durations T21, so that the electronic circuitry 130 could perform Step S31 once; that is, the control unit 134 would save one piece of spectral data acquired by the optical sensor 120 directly into the memory unit 136 every T21 until all of the exposure measurements are completed. The duration of the pause corresponds to the time interval between two exposures T21, and is thus very short, lasting less than 1 μs. Therefore, the pauses are omitted in FIG. 2A. Furthermore, the durations of exposures T21 are identical in the present embodiment; for example, FIG. 2A exemplarily illustrates three durations of exposures T21 of an identical length. However, in other embodiments, at least two of the durations T21 may be different.

As the pauses last only transiently, the control unit 134 would perform the next Step S21 during Step S31 so as to resume the optical sensor 120. In other words, Steps S21 and S31 are partially overlapped and the time interval between two adjacent exposures T21 may be shorter than the time T31 for the memory unit 136 to complete saving a piece of spectral data, as illustrated in FIG. 2A. Additionally, the duration of one exposure measurement (for example, T21) should be longer than the time T31 for the memory unit 136 to complete saving a piece of spectral data, so as to ensure that all measured spectral data are saved into the memory unit 136.

According to the foregoing, the control unit 134 may receive the trigger signals from the trigger line 132 so as to instruct the optical sensor 120 to perform multiple exposures, therefore allowing the spectrometer 100 to perform a plurality of exposure measurements continuously. During the measurements, the optical sensor 120 receives a plurality of spectral rays L2 generated by the dispersive element 110 to generate a plurality of spectral data, which are saved by the control unit 134 directly into the memory unit 136.

Furthermore, as the memory unit 136 may be a memory card or an USB, a user may remove the memory unit 136 after the exposure measurements are completed and connect the memory unit 136 to a processing device that can access and read the plurality of spectral data in the memory unit 136. The processing device may be a computer, mobile device, PLC, MCU, µP, or PLD.

It is to be noted that in the embodiment as illustrated in FIG. 2, all of the durations of exposures T21 are valid exposure times; that is, all of the spectral data acquired by the optical sensor 120 during T21 would be considered valid and be saved directly into the memory unit 136. However, in other embodiments, the measurement setting stored in the memory unit 136 may define at least one T21 as a duration of dummy exposure and set the length of the duration of dummy exposure accordingly. The optical sensor 120 would not consider the spectral data acquired during such dummy duration valid, and thus would not save the spectral data into the memory unit 136.

The duration of dummy exposure may be longer than T31 and may be arranged between two adjacent exposures; in other words, the duration of dummy exposure may be regarded as the time interval between two adjacent durations of exposures. Additionally, the durations of measurement exposure and dummy exposure are both adjustable parameters in the measurement setting. Therefore, by adjusting the lengths of the durations of measurement and dummy exposures, the spectrometer 100 may accomplish multiple measurement conditions and is thus advantageous in performing automated measurements.

Referring now to FIG. 2B. The spectrometer 100 may also perform continuous multiple exposure measurements according to the sequence illustrated in FIG. 2B. It is to be understood that the sequences shown in FIGS. 2A and 2B are similar, especially in Step S0 and the generation and storage of the measurement setting. Consequently, details on identical features between the two embodiments are not to be repeated herein, and distinct features between the two will be described in details in the followings.

Referring to FIGS. 1B and 2B. After Step S0 and time T0, the spectrometer 100 would perform Steps S1, S21 and S31 sequentially until the multiple exposure measurements are completed. In other words, the trigger line 132 of the present embodiment as shown in FIG. 2B is configured to transmit a plurality of trigger signals, each of which would cause the spectrometer 100 to perform one exposure measurement. The total number of exposure may be equal to the number of times the control unit 134 receives the trigger signals. Therefore, the measurement setting may include the number of times the control unit 134 receives the trigger signals, and thus the total number of exposures.

After a latency T1 following the control unit 134 receiving a trigger signal (Step S1), the control unit 134 would instruct the optical sensor 120 to perform one exposure for a duration of T22. Upon completion, the control unit 134 would save the piece of spectral data acquired by the optical sensor 120 directly into the memory unit 136 (Step S31). Thereafter, the control unit 134 waits for the next trigger signal (Step S1) so as to perform Steps S21 and S31. The duration T22 may be a duration of valid exposure as described previously.

The spectrometer 100 may repeatedly perform Steps S1, S21 and S31 until the multiple exposure measurement is completed. In the present embodiment as illustrated in FIG. 2B, the duration of exposure T22 may vary, and the time interval between two adjacent exposures T22 is significantly longer than the time T31 for the memory unit 136 to complete saving a piece of spectral data. However, other embodiments may have a plurality of identical durations of exposure T22 throughout the measurements. Moreover, as the length of the latency T1 is associated with the performance of the control unit 134, the spectrometer 100 may have a plurality of identical latencies T1 after reception of the trigger signals by the control unit 134.

Meanwhile, the memory unit 136 may be further configured to store a feedback program. When the feedback program is executed in Step S31, the control unit 134 analyzes a piece of spectral data acquired from at least one exposure measurement (Step S21), and determines the measurement setting of the optical sensor 120 for the upcoming exposure measurements according to the result of the analysis of the spectral data. The measurement setting may include at least one measurement parameter, for example, the durations of exposures and/or valid exposures T22, and may determine two different durations of exposures T22.

In the present embodiment, the control unit 134 may execute the feedback program so as to analyze the brightness of the acquired spectral data and set the duration of valid exposure T22 of the optical sensor 120 for the following measurements according to the result of the brightness analysis. More specifically, when the control unit 134 analyzes the spectral data stored in the memory unit 136 in Step S31, the control unit 134 would compare the brightness of at least one spectral ray L2 of a specific wavelength as shown in FIG. 1A against a reference brightness to determine if the brightness of the spectral data is greater than the reference brightness.

If the brightness of the spectral ray L2 is greater than the reference, the control unit 134 would not alter the exposure durations T22 of the optical sensor 120 for the upcoming measurements. However, if the brightness of the spectral ray L2 is weaker than the reference, the control unit 134 would extend the exposure durations T22 of the optical sensor 120 so as to increase the brightness of the spectral ray L2 in the following measurements, until the brightness becomes greater than the reference. Such analysis and adjustment ensures the acquisition of spectral data having the spectral ray L2 brighter than the reference brightness, therefore improving the chances of valid spectral measurements of the spectrometer 100.

According to the foregoing, the control unit 134 is capable of saving a plurality of spectral data acquired by the optical sensor 120 directly into the memory unit 135 when the spectrometer 100 performs multiple exposure measurements according to the trigger signals transmitted by the trigger line 132. Therefore, the spectrometer 100 of the present invention is capable of performing an exposure measurement right after a prior measurement is completed without having to wait for the acquired spectral data to be transmitted to a computer, as seen in spectrometers in the prior art. Consequently, the spectrometer 100 of the present invention can obtain a plurality of spectral data of special substances or objects, such as reaction intermediates or other short-lived compounds, by performing multiple continuous exposure measurements within a limited time frame.

Furthermore, according to the embodiment illustrated in FIG. 2B, the multiple exposure measurements performed by the spectrometer 100 may include two durations of exposures T22 of different lengths, thus enabling the spectrometer 100 to accomplish multiple measurement conditions, and hence execute automated measurements, by performing measurements according to various lengths of exposure durations T22.

It is to be understood that while the durations of exposure T22 may vary and all of the exposure durations T22 are considered valid exposure durations in the present embodiment as shown in FIG. 2B, other embodiments may have identical exposure durations T22 and at least one exposure duration T22 being a duration of dummy exposure, as described previously. In other words, the present invention is not limited to all exposure durations T22 having an identical length, nor is it limited to all exposure durations T22 being valid exposure durations.

Figure 3:
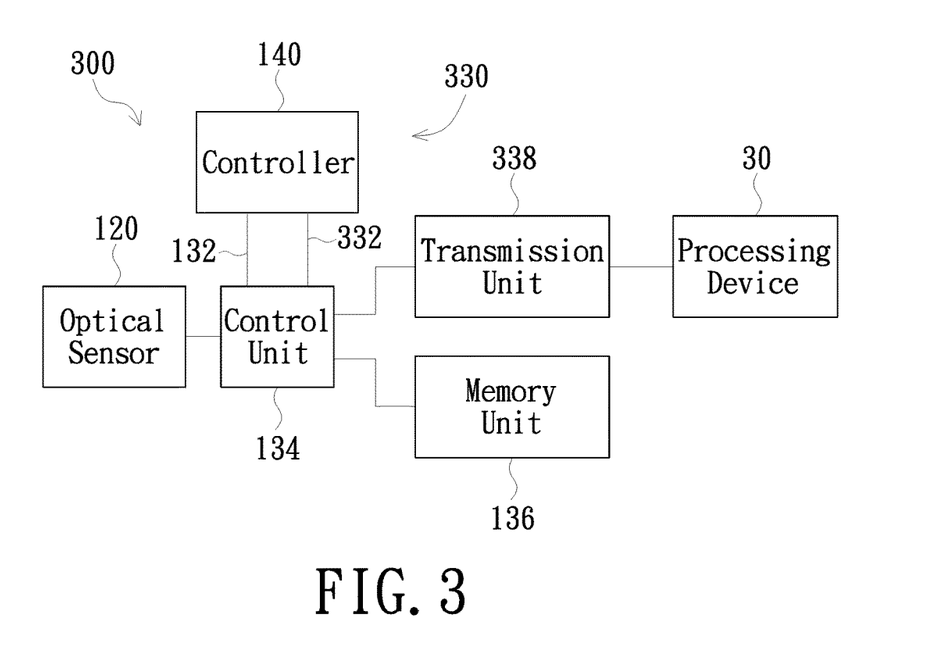
FIG. 3 is a block diagram illustrating the configuration of a spectrometer according to another embodiment of the present invention.

Referring now to FIG. 3. The spectrometer 300 includes an electronic circuitry 330 and can perform continuous multiple exposure measurements according to the sequences illustrated in at least one of FIG. 2A and FIG. 2B. The electronic circuitry 330 and the electronic circuitry 130 include a number of similar components, for example, the control unit 134 and the memory unit 136. However, the electronic circuitry 330 further includes a transmission unit 338.

The transmission unit 338 is electrically connected to the control unit 134 and the memory unit 136, and is configured to transmit a plurality of spectral data stored in the memory unit 136 to the processing device 30 for data processing. The processing device 30 may be a computer or a mobile device. The transmission unit 338 may be a hardware port, such as a serial port or a parallel port; and may electrically connect to the processing device 30 via a hardware transmission cable, such as a USB cable, an RS-232-C serial port, or an RS-485 serial port. The processing device 30 may also provide electricity to the control unit 134 via the hardware transmission cable and the transmission unit 338.

After at least two pieces of spectral data are stored the memory unit 136, the transmission unit 138 would transmit at least one of the two pieces of spectral data to the processing device 30. In other words, the transmission unit 338 would transmit the acquired spectral data only after at least two exposure measurements are performed; for example, the transmission unit 338 would transmit all acquired spectral data to the processing unit 30 after all exposure measurements are completed and all of the acquired spectral data are saved into the memory unit 136. However, it is to be understood that the transmission unit 338 according to other embodiments of the present invention may also transmit one or more spectral data to the processing device 30 during the second measurement or after the second measurement is completed.

In addition to the transmission unit 338, the electronic circuitry 300 may further include at least one hardware transmission line 332 that electrically connects to the control unit 134 and the controller 140. The hardware transmission line 332 is configured to transmit the electrical signals generated by the controller 140 to the control unit 134. While the configuration and material of the hardware transmission line 332 may be identical to those of the trigger line 132, the hardware transmission line 332 only transmits the reset signal and the setting signal, but not the trigger signals. The trigger signals are transmitted only by the trigger line 132. Furthermore, the controller 140 (for example, a computer or a mobile device) may also provide electricity to the control unit 134 via the hardware transmission line 332.

It is to be understood that the hardware transmission line 332 in the electronic circuitry 330 as illustrated in FIG. 3 may be omitted, and all of the reset signal, the setting signal, and the trigger signals are transmitted by the trigger line 132. In other words, the present invention is not limited to the electronic circuitry 300 having the hardware transmission line 332. On the other hand, the hardware transmission line 332 may also be used in the electronic circuitry 130 illustrated in FIG. 1B; that is, the transmission line 332 may be electrically connected to the control unit 134 and the controller 140 shown in FIG. 1B.

Figure 4:
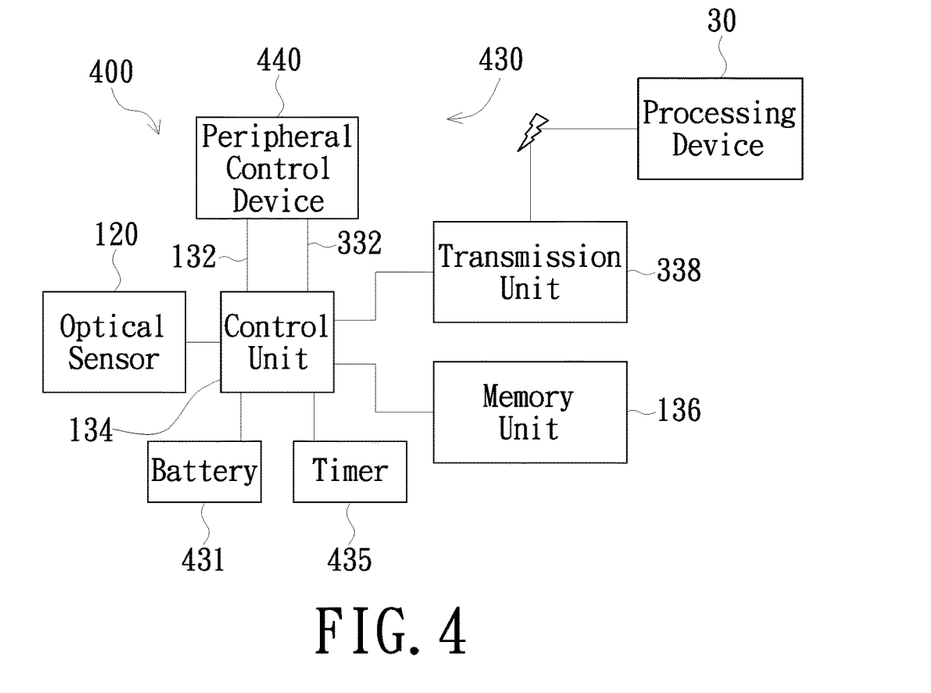
FIG. 4 is a block diagram illustrating the configuration of a spectrometer according to yet another embodiment of the present invention.

Referring now to FIG. 4. The spectrometer 400 includes an electronic circuitry 430 and can perform continuous multiple exposure measurements according to the sequences illustrated in at least one of FIG. 2A and FIG. 2B. The electronic circuitry 430 shown in FIG. 4 and the electronic circuitry 330 shown in FIG. 3 includes a number of similar components, for example, the control unit 134 and the memory unit 136. Consequently, details on identical features between the two electronic circuitries 430 and 330 are not to be repeated herein, and distinct features between the two will be described in details in the followings.

The spectrometer 400 differs from the spectrometer 300 in the transmission unit 438, which is a wireless transceiving module such as a Bluetooth module. Instead of electrically connecting to the processing unit 30, the transmission unit 438 is wirelessly linked to the processing unit 30. In other words, the transmission unit 438 is configured to transmit all acquired spectral data wirelessly to the processing unit 30 for data processing.

The electronic circuitry 430 may further include a battery 431 that is electrically connected to the control unit 134 and configured to provide electricity to the control unit 134 and the optical sensor 120 for the spectrometer 400 to operate. The battery 431 may be a dry cell, a primary cell, or a rechargeable battery such as nickel-metal hydride battery, lithium-ion battery, or lithium polymer battery. Additionally, the battery 431 as shown in FIG. 4 may also be utilized in the electronic circuitries 130 and 330 as shown in FIG. 1B and FIG. 3. In other words, the battery 431 may be electrically connected to the control unit 134 as illustrated in FIG. 1B and FIG. 3 to provide electricity to the control unit 134 and the optical sensor 120 in FIG. 1B and FIG. 3.

Furthermore, the electronic circuitry 430 may also include a timer 435. The timer 435 is electrically connected to the control unit 134, and is configured to determine if the multiple exposure measurements as illustrated in FIGS. 2A and 2B have exceeded a default duration of time. If the duration has exceeded the default duration, the control unit 134 would instruct the optical sensor 120 to stop exposing and thus stop the multiple exposure measurements. Therefore, excessive uninterrupted measurements of the spectrometer 400 may be avoided.

Taking the sequence shown in FIG. 2A for example. In the case where the default duration is 30 seconds, the timer 435 would start counting once the control unit 134 receives the setting signal and enters the trigger mode (Step S0) and determine if 30 seconds have passed theresince. If the timer 435 determines that 30 seconds have passed during one of the multiple exposure measurements, the control unit 134 would stop the measurement and spectral data acquired during the measurement would not be saved. By utilizing the timer 435, the multiple exposure measurements could be interrupted timely to avoid excessive measurement runs of the spectrometer 400. Furthermore, the timer 435 as shown in FIG. 4 may also be utilized in the electronic circuitries 130 and 330 as shown in FIG. 1B and FIG. 3; that is, the timer 435 may be electrically connected to the control unit 134 in FIG. 1B and FIG. 3 to determine if the exposure measurements have exceeded the default duration of time.

In the present embodiment as illustrated in FIG. 4, the trigger line 132 and the hardware transmission line 332 are electrically connected to a peripheral control device 440, rather than the controller 140. The peripheral control device 440 is configured to transmit the trigger signals from the trigger line 132 to the control unit 134, and to transmit the reset signal and the setting signal from the hardware transmission line 332 to the control unit 134. In other words, the peripheral control device 440 may control the exposure measurements to be performed by the spectrometer 400. It is to be understood that the hardware transmission line 332 may be omitted in the spectrometer 400, and the peripheral control device 440 may be configured to transmit the trigger signals, the reset signals and the setting signals only from the trigger line 132 to the control unit 134. Therefore, the present invention is not limited to the electronic circuitry 430 having the hardware transmission line 332.

The peripheral control device 440 is utilized as a supporting device for the spectrometer 400, and may be integrated with the spectrometer 400 to form an automated spectral measurement system. For example, when measuring a light source such as a liquid crystal display (LCD) or a light emitting diode (LED) by using the spectrometer 400, the peripheral control device 440 may be a mechanical holder for disposing the light source and may control the emission of the light source and exposure of the optical sensor 120. Consequently, the peripheral control device 440 may control the light source to emit at predetermined time points, so that automation of the continuous multiple exposure measurements using the spectrometer 400 may be achieved.

In sum, the electronic circuitry according to the embodiments of the present invention utilizes the memory unit to save the plurality of spectral data directly from the spectrometer, therefore allowing the spectrometer to perform multiple exposure measurements continuously without having to pause between measurements for transmission of spectral data to a processing device. Therefore, the spectrometer of the present invention can continuously expose and measure within a limited time frame, and is thus advantageous in acquiring sufficient amounts of valid spectral data for analysis of reaction intermediates or other special substances or objects. Furthermore, according to one of the aforementioned embodiments, the spectrometer can accomplish multiple measurement conditions by performing various durations of exposure measurements, and is therefore advantageous in executing automated spectral measurements.

While the invention has been described in terms of what is presently considered to be the most practical embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic circuitry of a spectrometer, configured to electrically connect with an optical sensor of the spectrometer and comprising:
  a memory unit, configured to store a first measurement setting having a sequence of a first plurality of exposure measurements listed therein, a duration of a first exposure measurement out of the first plurality of exposure measurements being different from a duration of a second exposure measurement out of the first plurality of exposure measurements;
  a trigger line electrically connected to an external controller, and configured to transmit a first trigger signal generated from the external controller;
  a control unit, electrically connected to the trigger line and the memory unit, the control unit configured to receive the first trigger signal from the trigger line so as to instruct the spectrometer to perform the first plurality of exposure measurements one by one for a plurality of times continuously without requirement of additional trigger signal other than the first trigger signal based on the first measurement setting until all of the first plurality of exposure measurements in the first measurement setting are completely performed, the control unit further configured to save spectral data acquired from the spectrometer performing each of the first plurality of exposure measurements into the memory unit one by one corresponding to the sequence of the first plurality of exposure measurements; and
  a transmission unit electrically connected to the control unit and the memory unit, and configured to transmit the saved spectral data in the memory unit out of the spectrometer for further use.

2. The electronic circuitry according to claim 1, wherein the control unit receives the first trigger signal so as to instruct the optical sensor to perform exposures only under a trigger mode.

3. The electronic circuitry according to claim 1, wherein the first measurement setting comprises settings of a dummy exposure, the control unit abandons spectral data acquired from the dummy exposure based on the setting of the dummy exposure.

4. The electronic circuitry according to claim 3, wherein a time interval between two adjacent exposure measurements is shorter than a duration of time for the memory unit to complete saving a piece of spectral data.

5. The electronic circuitry according to claim 3, wherein the control unit receives a reset signal and initializes the memory unit according to the reset signal to change the first measurement setting.

6. The electronic circuitry according to claim 5, wherein the reset signal and the setting signal are transmitted by the trigger line.

7. The electronic circuitry according to claim 5, further comprising at least one hardware transmission line electrically connected to the control unit, wherein the reset signal and the setting signal are transmitted by the at least one hardware transmission line.

8. The electronic circuitry according to claim 1,
  wherein the transmission unit is configured to transmit the plurality of spectral data stored in the memory unit to a processing device;

wherein after at least two pieces of spectral data are stored in the memory unit, the transmission unit transmits at least one of the at least two pieces of spectral data to the processing device.

9. The electronic circuitry according to claim 1, wherein the memory unit is further configured to store a feedback program, the control unit executes the feedback program so as to analyze at least one of the spectral data, and determines the first measurement setting of the optical sensor for upcoming exposure measurements according to an analysis result of at least one of the spectral data, and the first measurement setting determines at least one measurement parameter of the optical sensor.

10. The electronic circuitry according to claim 9, wherein the measurement parameter comprises a duration of exposure, and when the feedback program is executed, the control unit determines the duration of exposure for the upcoming exposure measurements according to the analysis result of at least one of the spectral data.

11. The electronic circuitry according to claim 1, further comprising:
   a timer electrically connected to the control unit and configured to determine if a duration of the first plurality of exposure measurements has exceeded a default duration;
   wherein if the duration has exceeded the default duration, the control unit stops the first plurality of exposure measurements.

12. The electronic circuitry according to claim 1, wherein the trigger line is configured to transmit a plurality of first trigger signals, when the control unit receives one of the first trigger signals, the control unit instructs the optical sensor to perform an exposure after a latency, and durations of a plurality of latencies generated after the control unit receives the first trigger signals are identical.

13. The electronic circuitry according to claim 1, wherein the memory unit is further configured to store a second measurement setting, the trigger line is further configured to transmit a second trigger signal after the first trigger signal is received and executed, the control unit is further configured to receive the second trigger signal from the trigger line so as to instruct the spectrometer to perform a second plurality of exposure measurements continuously based on the second measurement setting.

14. The electronic circuitry according to claim 1, wherein the first trigger signal is a signal having signal edges, the control unit instructs the spectrometer to perform the first plurality of exposure measurements according to the signal edges.

15. The electronic circuitry according to claim 1, wherein a performing time of a selective exposure measurement of the first plurality of exposure measurements is partially overlapped with a storing time of spectral data acquired from a previous exposure measurement of the first plurality of exposure measurements prior to the selective exposure measurement.

16. A spectrometer using an electronic circuitry for performing a first plurality of exposure measurements, comprising:
   a dispersive element, configured to generate a plurality of spectral rays during the first plurality of exposure measurements;
   an optical sensor, configured to receive the spectral rays during the first plurality of exposure measurements so as to generate a plurality of spectral data; and
   the electronic circuitry, comprising:
      a memory unit, configured to store a first measurement setting having a sequence of the first plurality of exposure measurements listed therein, a duration of a first exposure measurement out of the first plurality of exposure measurements being different from a duration of a second exposure measurement out of the first plurality of exposure measurements;
      a trigger line electrically connected to a peripheral control device, and configured to transmit a first trigger signal generated from the peripheral control device;
      a control unit, electrically connected to the optical sensor, the trigger line and the memory unit, and the control unit configured to receive the first trigger signal from the trigger line so as to instruct the spectrometer to perform the first plurality of exposure measurements one by one for a plurality of times continuously without requirement of additional trigger signal other than the first trigger signal based on the first measurement setting until all of the first plurality of exposure measurements in the first measurement setting are completely performed, the control unit further configured to save spectral data acquired from the spectrometer performing each of the first plurality of exposure measurements into the memory unit one by one corresponding to the sequence of the first plurality of exposure measurements; and
      a transmission unit electrically connected to the control unit and the memory unit, and configured to transmit the saved spectral data in the memory unit out of the spectrometer for further use.

17. The spectrometer according to claim 16, wherein the first measurement parameter comprises settings of a dummy exposure, the control unit abandons spectral data acquired from the dummy exposure based on the setting of the dummy exposure.

18. The spectrometer according to claim 17, wherein a time interval between two adjacent exposure measurements is shorter than a duration of time for the memory unit to complete saving a piece of spectral data.

19. The spectrometer according to claim 17, further comprising:
   a peripheral device and at least one hardware transmission line electrically connected to the control unit;
   wherein the control unit receives a reset signal and initializes the memory unit according to the reset signal to change the first measurement setting, and the peripheral control device is electrically connected to the trigger line and the hardware transmission line, and configured to transmit the first trigger signal via the trigger line to the control unit, and to transmit the reset signal and the setting signal via the hardware transmission line to the control unit.

20. The spectrometer according to claim 16
   wherein the control unit receives a reset signal and initializes the memory unit according to the reset signal to change the first measurement setting, and the reset signal and the setting signal are transmitted by the trigger line.

21. The spectrometer according to claim 16, wherein the memory unit is further configured to store a second measurement setting, the trigger line is further configured to transmit a second trigger signal after the first trigger signal is received and executed, the control unit is further configured to receive the second trigger signal from the trigger line so as to instruct the spectrometer to perform a second plurality of exposure measurements continuously based on the second measurement setting.

22. A measurement method of a spectrometer having an optical sensor and an electronic circuitry which comprises a control unit and a memory unit, steps of the measurement method executed by the control unit comprising:
receiving a first trigger signal from an external controller via a trigger line;
instructing the optical sensor of the spectrometer to perform a first plurality of exposure measurements one by one for a plurality of times continuously without requirement of additional trigger signal other than the first trigger signal based on a first measurement setting stored in the memory unit according to the first trigger signal until all of the first plurality of exposure measurements in the first measurement setting are completely performed, the first measurement setting having a sequence of the first plurality of exposure measurements listed therein, a duration of a first exposure measurement out of the first plurality of exposure measurements being different from a duration of a second exposure measurement out of the first plurality of exposure measurements;
saving, by the control unit, spectral data acquired from the spectrometer performing each of the first plurality of exposure measurements into the memory unit one by one corresponding to the sequence of the first plurality of exposure measurements; and
transmitting the saved spectral data in the memory unit, by a transmission unit electrically connected to the control unit and the memory unit, out of the spectrometer for further use.

23. The measurement method according to claim 22, further comprising:
executing a feedback program so as to analyze at least one of the spectral data; and
determining the measurement setting for upcoming exposure measurements according to an analysis result of at least one of the spectral data;
wherein the measurement setting determines at least one measurement parameter.

24. The measurement method according to claim 23, wherein the measurement parameter comprises a duration of exposure, and when the feedback program is executed, the control unit determines a duration of exposure for the upcoming exposure measurements according to the analysis result of at least one of the spectral data.

25. The measurement method according to claim 22, further comprising:
receiving a second trigger signal from the trigger line after the first trigger signal is received and executed; and
instructing the spectrometer to perform a second plurality of exposure measurements continuously based on a second measurement setting stored in the memory unit according to the second trigger signal.

26. The measurement method according to claim 22, further comprising:
instructing the spectrometer to perform a dummy exposure based on the first measurement setting having settings of the dummy exposure; and
abandoning spectral data acquired from the dummy exposure based on the setting of the dummy exposure.

* * * * *